United States Patent [19]

Aihara et al.

[11] Patent Number: 5,945,363
[45] Date of Patent: Aug. 31, 1999

[54] SILICON NITRIDE SINTERED MATERIAL

[75] Inventors: Yasufumi Aihara, Nagoya; Katsuhiro Inoue, Ama-gun, both of Japan

[73] Assignee: NGK Insulators, Ltd., Nagoya, Japan

[21] Appl. No.: 08/912,516

[22] Filed: Aug. 18, 1997

[30] Foreign Application Priority Data

Aug. 20, 1996 [JP] Japan .................................. 8-218809

[51] Int. Cl.$^6$ .................................................. C04B 35/587
[52] U.S. Cl. .......................................................... 501/97.2
[58] Field of Search ............................................. 501/97.2

[56] References Cited

U.S. PATENT DOCUMENTS

| | | | |
|---|---|---|---|
| 5,096,859 | 3/1992 | Sakai et al. | 501/97.2 |
| 5,118,644 | 6/1992 | Watanabe et al. | 501/97.2 |
| 5,316,856 | 5/1994 | Suzuki et al. | 501/97.2 |
| 5,545,597 | 8/1996 | Yeckley | 501/97.2 |
| 5,631,200 | 5/1997 | Ukegawa et al. | 501/97.2 |
| 5,691,261 | 11/1997 | Takahashi et al. | 501/97.1 |

FOREIGN PATENT DOCUMENTS

| | | |
|---|---|---|
| 64-56368 | 3/1989 | Japan . |
| 64-61357 | 3/1989 | Japan . |
| 64-61358 | 3/1989 | Japan . |
| 3-205363 | 9/1991 | Japan . |
| 3-290369 | 12/1991 | Japan . |
| 6-219840 | 8/1994 | Japan . |
| 6-227866 | 8/1994 | Japan . |
| 7-29855 B2 | 4/1995 | Japan . |
| 7-33290 B2 | 4/1995 | Japan . |

OTHER PUBLICATIONS

Patent Abstracts of Japan, Publication No. 6–227866A, Publication Date: Aug. 16, 1994.

M. Isomura et al. "High–strength silicon nitride ceramics and their manufacture", *Chemical Abstracts*, vol. 118, No. 8, Abstract No. 65444, Feb. 22, 1993.

*Primary Examiner*—Karl Group
*Attorney, Agent, or Firm*—Kubovick & Kubovcik

[57] ABSTRACT

A silicon nitride sintered material includes silicon nitride and rare earth element compounds. Y and Yb are contained as the rare earth elements in a total amount of 5–7 mole % in terms of oxides, Yb/Y is 4/6 to 9/1 in terms of molar ratio of oxides, and the crystal phases of grain boundary contain a H phase and a J phase with the proportion of the H phase being larger than that of the J phase. A process for producing a silicon nitride sintered material includes the steps of mixing a $Si_3N_4$ powder with $Y_2O_3$ and $Yb_2O_3$ both as a sintering aid, the total amount of $Y_2O_3$ and $Yb_2O_3$ being 5–7 mole % and the molar ratio of $Yb_2O_3/Y_2O_3$ being 4/6 to 9/1, molding the resulting mixture, sintering the molded material in a nitrogen atmosphere at 1,850–1,950° C., and heat-treating the sintered material in air at 1,000–1,500° C. for 0.5–10 hours. The silicon nitride sintered material has, in a small or large thickness, oxidation resistance and strength at low temperatures while retaining high strength at high temperatures.

2 Claims, No Drawings

SILICON NITRIDE SINTERED MATERIAL

BACKGROUND OF THE INVENTION AND RELATED ART STATEMENT

The present invention relates to a silicon nitride sintered material high in high-temperature strength and superior in low-temperature oxidation resistance, as well as to a process for production of such a sintered material.

Silicon nitride sintered materials have drawn attention for their high high-temperature strength, chemical stability, etc., and various studies have been made on their uses as a material for heat engines such as diesel engine, gas turbine and the like. Since silicon nitride is generally difficult to sinter, a silicon nitride sintered material is produced by mixing a silicon nitride powder with a rare earth element oxide(s) (e.g. $Y_2O_3$) as sintering aid to obtain a molding powder, molding the powder into a desired shape, and subjecting the molded material to, for example, firing under gas pressure.

Silicon nitride sintered materials of high high-temperature strength having, as the grain boundary crystal phase(s), apatite structure crystals (hereinafter referred to as H phase) and rare earth element disilicate crystals (hereinafter referred to as S phase), or wollastonite structure crystals (hereinafter referred to as K phase) or cuspidine structure crystals (hereinafter referred to as J phase), or merrilite crystals (hereinafter referred to as M phase) are disclosed in Japanese Patent Application Laid-Open (Kokai) No. 1-56368 or Japanese Patent Application Laid-Open (Kokai) No. 1-61357 or Japanese Patent Application Laid-Open (Kokai) No. 1-61358, respectively.

In general, silicon nitride sintered materials containing $Re_2SiO_5$ (hereinafter referred to as L phase) or a S phase as the main crystals of grain boundary have low-temperature oxidation resistance. However, $Re_2SiO_5$ is difficult to form as stable main crystals of grain boundary, and a silicon nitride sintered material having an S phase as main crystals of grain boundary is low in high-temperature strength.

In order for a silicon nitride sintered material to show high high-temperature strength, it is preferable that the crystal phase(s) of grain boundary of the sintered material is (are) a crystal phase(s) having a high ratio of rare earth element oxides(s)/$SiO_2$ and containing nitrogen, such as J or H phase. However, when a silicon nitride sintered material has these crystal phases at the grain boundaries, there occurs selective oxidation of grain boundary phases in air at 800–1,000° C. (this selective oxidation is hereinafter referred to as low-temperature oxidation); as a result, different crystals are formed, resulting in volume expansion and consequent cracking, and the mechanical properties of the silicon nitride sintered material are impaired.

The temperature at which the low-temperature oxidation takes place most violently, is about 900° C. although it varies slightly depending upon the composition of grain boundary phases and the kinds of the crystals constituting said phases.

In order to prevent the low-temperature oxidation, Japanese Patent Application Laid-Open (Kokai) No. 6-227866 discloses a method of heat-treating a silicon nitride sintered material in air to form an oxide layer thereon.

This method, however, has a serious problem in that when the oxide layer is peeled even partially by, for example, foreign objects (Foreign Object Damage (FOD)), low-temperature oxidation begins at the portion where peeling has occurred, which invites cracking.

Further, while very strict dimensional accuracy is required for products such as gas turbine and the like, even if a product of high dimensional accuracy is made by machining of a sintered material, a dimensional error is caused due to a creep when the product is subjected to a heat treatment so as to form an oxide layer.

SUMMARY OF THE INVENTION

In view of the above-mentioned problems of the prior art, the present invention has been completed with an aim of providing a silicon nitride sintered material of small or large thickness which has oxidation resistance and strength at low temperatures while retaining high strength at high temperatures, and a process for producing such a sintered material.

According to the present invention, there is provided a silicon nitride sintered material comprising silicon nitride and rare earth element compounds, wherein Y and Yb are contained as the rare earth elements in a total amount of 5–7 mole % in terms of oxides, Yb/Y is 4/6 to 9/1 in terms of molar ratio of oxides, and the crystal phases of grain boundary contain a H phase and a J phase with the proportion of the H phase being larger than that of the J phase.

The silicon nitride sintered material of the present invention gives a flexural strength of 500 MPa or more at 1,400° C. as measured for a test piece cut out from the center of 20 mm-thick sample of silicon nitride sintered material.

According to the present invention, there is also provided a process for producing a silicon nitride sintered aterial comprising silicon nitride and rare earth element compounds, which comprises:

mixing a $Si_3N_4$ powder with $Y_2O_3$ and $Yb_2O_3$ both as a sintering aid, the total amount of $Y_2O_3$ and $Yb_2O_3$ being 5–7 mole % and the molar ratio of $Yb_2O_3/Y_2O_3$ being 4/6 to 9/1, molding the resulting mixture, sintering the molded material in a nitrogen atmosphere at 1,850–1,950° C., and heat-treating the sintered material in air at 1,000–1,500° C. for 0.5–10 hours.

The $Si_3N_4$ powder used in the process of the present invention is preferably a mixture of $\alpha$-$Si_3N_4$ and $\beta$-$Si_3N_4$, satisfying the following formula:

$$\beta/(\alpha+\beta) \geq 0.1$$

(wherein $\alpha$ is the weight of $\alpha$-$Si_3N_4$ and $\beta$ is the weight of $\beta$-$Si_3N_4$).

DETAILED DESCRIPTION OF THE INVENTION

In the silicon nitride sintered material of the present invention comprising silicon nitride and rare earth element compounds, Y and Yb each as rare earth element are contained in a total amount of 5–7 mole % in terms of oxides.

The reasons are as follows. When the total amount of Y and Yb each as rare earth element is less than 5 mole % in terms of oxides, the resulting sintered material has insufficient strength at high temperatures. When the total amount is more than 7 mole %, the proportion of J phase in the resulting sintered material is large, allowing the sintered material to have low oxidation resistance at low temperatures.

Also in the silicon nitride sintered material of the present invention, Yb/Y (molar ratio of oxides) is 4/6 to 9/1.

The reason is that $4/6 \leq Yb/Y \leq 9/1$ gives a silicon nitride sintered material highest in density, strength and low-temperature oxidation resistance.

It is because when the amount of $Yb_2O_3$ is large, the resulting sintered material has a high density owing to the density-increasing effect of $Yb_2O_3$ and, when $Y_2O_3$ is added, a H phase of apatite structure having high-temperature strength and high low-temperature oxidation resistance is easily formed in the crystal phase of grain boundary.

Meanwhile, when $0 \leq Yb/Y < 4/6$, the resulting sintered material has insufficient density and has low internal strength and, when $9/1 < Yb/Y < 10/0$, the resulting sintered material has a large proportion of a J phase and is low in low-temperature oxidation resistance.

The silicon nitride sintered material of the present invention preferably contains, as the crystal phases of grain boundary, an H phase and a J phase so that the proportion of the H phase becomes larger than that of the J phase.

The reason is as follows. A $Y_2O_3$—$Yb_2O_3$ system can generate S, L, H and J phases as crystal phases. The S and L phases containing no nitrogen are low in high-temperature strength. As to the H phase, even when it gives rise to low-temperature oxidation, there takes place only replacement of nitrogen with oxygen and there takes place no change in crystal structure. When the J phase is oxidized at a low-temperature, the J phase changes into the L phase. In accordance with the change, volume is expanded, which induces cracking and reduction in mechanical properties.

The silicon nitride sintered material of the present invention preferably has a flexural strength of 500 MPa or more at 1,400° C. as measured for a test piece cut out from the center of 20 mm-thick sample of silicon nitride sintered material, in view of the use as a member of ceramic gas turbine (CGT), etc.

The silicon nitride sintered material of the present invention, even when having a thickness of 20 mm or more, can have a high density even to the interior and can have a high internal strength, by controlling the ratio of $\alpha$-$Si_3N_4$ and $\beta$-$Si_3N_4$ used.

The mechanism for formation of $Si_3N_4$ sintered material is presumed to be as follows. In the firing step, at first, $SiO_2$ and a sintering aid (e.g. $Y_2O_3$) both present on the surface of a $Si_3N_4$ powder are melted and reacted with each other to form a liquid phase. As the formation of the liquid phase proceeds, $\alpha$-$Si_3N_4$ and $\beta$-$Si_3N_4$ each of random orientation are reoriented. Next, $\alpha$-$Si_3N_4$ (and part of $\beta$-$Si_3N_4$) is melted and precipitated in the vicinity of relatively large $\beta$-$Si_3N_4$ (this becomes nuclei of crystal growth), in the form of $\beta$-$Si_3N_4$ columnar crystals, whereby a $Si_3N_4$ sintered material is formed.

In such a sintering mechanism, when the raw material $Si_3N_4$ powder contains a large proportion of $\alpha$-$Si_3N_4$, the amount of $\alpha$-$Si_3N_4$ converted into $\beta$-$Si_3N_4$ is large and the amount of $\beta$-$Si_3N_4$ becoming nuclei of crystal growth is small; consequently, the distribution of $\beta$-$Si_3N_4$ becomes nonuniform, sintering is not sufficient at thick portions, and the resulting sintered material has low internal strength.

Therefore, it is presumed that by controlling the amount of $\beta$-$Si_3N_4$ contained in a raw material $Si_3N_4$ powder, as specified in the present invention, there can be obtained a silicon nitride sintered material wherein $\beta$-$Si_3N_4$ is uniformly distributed and which has high density and high internal strength.

In view of the above, the present process for producing a silicon nitride sintered material is as follows.

First, an $\alpha$-$Si_3N_4$ powder and a $\beta$-$Si_3N_4$ powder are mixed preferably so as to satisfy the following formula:

$$\beta/(\alpha+\beta) \geq 0.1$$

(wherein $\alpha$ is the weight of $\alpha$-$Si_3N_4$ and $\beta$ is the weight of $\beta$-$Si_3N_4$).

In this case, it is preferable that the $\alpha$-$Si_3N_4$ powder has an average particle diameter of 0.3–1.0 $\mu$m and the $\beta$-$Si_3N_4$ powder has an average particle diameter of 0.3–3 $\mu$m.

It is because that use of $\alpha$-$Si_3N_4$ having an average particle diameter larger than 1.0 $\mu$m results in low sinterability and use of $\beta$-$Si_3N_4$ having an average particle diameter larger than 3 $\mu$m forms $\beta$-$Si_3N_4$ columnar particles having a brachyaxis diameter of 3 $\mu$m or larger and gives a sintered material of low strength.

Next, the mixed powder obtained above is mixed with a sintering aid (for example, rare earth element oxides and metal carbides) of 5–25% by weight based on the total amount of the mixed powder and the sintering aid.

In the present invention, $Y_2O_3$ and $Yb_2O_3$ are used as a sintering aid and are added so as to give a total amount of 5–7 mole % and a $Yb_2O_3/Y_2O_3$ ratio (molar ratio) of 4/6 to 9/1.

Then, the resulting mixture is ground using, for example, silicon nitride balls, followed by drying, to obtain a molding powder.

The molding powder is subjected to molding such as press molding, extrusion molding, cast molding or the like to obtain a molded material having a desired shape.

The molded material is fired in a nitrogen atmosphere of 1 atm. or more at 1,850–1,950° C. for about 2–8 hours, whereby a $Si_3N_4$ sintered material can be obtained.

In the firing, the pressure and temperature of the nitrogen atmosphere used are preferably such that causes no decomposition of silicon nitride.

In crystallization occurring during the temperature-decreasing stage of firing, among all crystal phases (S, L, H and J phases) precipitatable in a $Y_2O_3$—$Yb_2O_3$ system, a J phase of highest crystallization rate precipitates predominantly. In this case, when the temperature-decreasing rate is high, the resulting grain boundaries consist of only a J phase and a vitreous phase.

Since the temperature-decreasing stage of firing is conducted in a nitrogen atmosphere, a J phase of highest nitrogen content is precipitated more easily.

A high proportion of J phase, however, is not preferred because the resulting sintered material has inferior low-temperature oxidation resistance.

Hence, in the present invention, the sintered material wherein the total amount of $Y_2O_3$ and $Yb_2O_3$ and the $Yb_2O_3/Y_2O_3$ ratio (molar ratio) are controlled, is heat-treated in air of about 1,000–1,500° C. for about 0.5–10 hours; thereby, it was made possible to effectively precipitate an H phase having high strength at high temperatures and high oxidation resistance at low temperatures.

This makes possible a silicon nitride sintered material free from low-temperature oxidation, and low-temperature oxidation is not caused even if an oxide layer on a surface of the sintered material is exfoliated by a chipping due to FOD, etc.

By subjecting, to machining, the sintered material after heat treatment in air, a product of high dimensional accuracy and free from low-temperature oxidation can be produced.

The present invention is described in more detail by way of Examples. However, the present invention is in no way restricted to these Examples.

The sintered material obtained in each Example was evaluated for performances according to the following test methods.

(Test Method for Flexural Strength)

Each silicon nitride sintered material obtained was subjected to a four-point bending strength (flexural strength)

test at 1,400° C. according to JIS R 1601 [Testing method for flexural strength (modulus of rupture) of fine ceramics], using an inside plane of the sintered material at the half thickness of the sintered material as a tensile plane.

(Test Method for Crystal Phases of Grain Boundary)

Each crystal phase of grain boundary was determined from the result of X-ray diffractometry using a CuKα ray.

J phase is crystals of cuspidine structure and has the same diffraction line as $Si_3N_4.4Y_2O_3.SiO_2$ represented by JCPDS card 32-1451. In the J phase crystals, the position of Y can be replaced by other rare earth element.

H phase is crystals of apatite structure and has the same diffraction line as $Si_3N_4.10Y_2O_3.9SiO_2$ represented by JCPDS card 30-1462. In the H phase crystals, the position of Y can be replaced by other rare earth element.

The proportion of particular grain boundary crystal phase was determined by summing up the integral intensities of maximum peaks of all grain boundary crystal phases excluding β-$Si_3N_4$ and calculating the proportion of the integral intensity of the particular grain boundary crystal phase to the total integral intensity.

(Test Method for Weight Increase by Oxidation)

Weight increase by oxidation is a yardstick for low-temperature oxidation resistance. Smaller weight increase by oxidation indicates higher low-temperature oxidation resistance.

A sintered material after heat treatment in air was subjected to 1-mm surface grinding to remove the surface oxide film; the resulting material was placed in an electric furnace at 900° C. for 100 hours; then, weight increase was measured.

EXAMPLES 1–7 AND COMPARATIVE EXAMPLES 1–5

An α-$Si_3N_4$ powder (purity: 97% by weight, oxygen content: 1.40% by weight, specific surface area measured by BET method: 12.0 m²/g) and a β-$Si_3N_4$ powder (purity: 98% by weight, oxygen content: 0.8% by weight, specific surface area measured by BET method: 9.0 m²/g) were mixed at a ratio shown in Table 1.

To the resulting mixed powder were added, each as a sintering aid, $Y_2O_3$ (average particle diameter: 0.7 μm, specific surface area measured by BET method: 10.0 m²/g) and $Yb_2O_3$ (average particle diameter: 0.5 μm, specific surface area measured by BET method: 9.0 m²/g) at a ratio shown in Table 1.

There were further added $MoC_2$ (average particle diameter: 1.5 μm, specific surface area measured by BET method: 2.0 m²/g) and SiC (average particle diameter: 0.2 μm, specific surface area measured by BET method: 20.0 m²/g) in amounts of 2% by weight and 1% by weight, respectively, based on the total amount of the mixed powder and the sintering aid.

20 kg of the resulting mixture was placed in a 100-liter media agitating mill together with 40 g of silicon nitride-based balls and water, followed by grinding for 3 hours.

Drying was conducted to evaporate water and granulation was made to obtain a molding powder having an average particle diameter of 50 μm.

The molding powder was subjected to press molding at a pressure of 200 kg/cm² and then to hydrostatic pressing at a pressure of 5 ton/cm² to obtain a molded material of 80 mm×80 mm×24 mm (thickness).

The molded material was fired in a nitrogen atmosphere of 9.5 atm. at 1,900° C. for 3 hours and then heat-treated in air at 1,300° C. for 1 hour to obtain various silicon nitride sintered materials of about 67 mm×67 mm×20 mm (thickness).

Each silicon nitride sintered material was measured for flexural strength, grain boundary crystal phases and weight increase by oxidation. The results are shown in Table 1.

TABLE 1

| | Amound added (mole %) | | | Molar ratio | | $Si_3N_4$ mixing ratio | Flexural strength (MPa) | Grain boundary crystal phases | Weight increase by oxidation |
| --- | --- | --- | --- | --- | --- | --- | --- | --- | --- |
| | $Y_2O_3$ | $Yb_2O_3$ | Total | $Y_2O_3$ | $Yb_2O_3$ | β/(α + β) | 1,400° C. | H phases/J phases | (mg/cm²) |
| Example 1 | 1.5 | 3.5 | 5.0 | 0.30 | 0.70 | 0.2 | 550 | 100/0 | 0.30 |
| Example 2 | 1.8 | 4.2 | 6.0 | 0.30 | 0.70 | 0.2 | 670 | 75/25 | 0.40 |
| Example 3 | 1.9 | 4.6 | 6.5 | 0.29 | 0.71 | 0.2 | 700 | 65/35 | 0.45 |
| Example 4 | 2.1 | 4.9 | 7.0 | 0.30 | 0.70 | 0.2 | 680 | 55/45 | 0.55 |
| Example 5 | 0.8 | 5.7 | 6.5 | 0.12 | 0.88 | 0.2 | 720 | 55/45 | 0.50 |
| Example 6 | 3.2 | 3.3 | 6.5 | 0.49 | 0.51 | 0.2 | 600 | 80/20 | 0.40 |
| Example 7 | 3.9 | 2.6 | 6.5 | 0.60 | 0.40 | 0.2 | 550 | 90/10 | 0.35 |
| Comparative Example 1 | 1.2 | 2.8 | 4.0 | 0.30 | 0.70 | 0.2 | 470 | 100/0 | 0.20 |
| Comparative Example 2 | 2.2 | 5.3 | 7.5 | 0.29 | 0.71 | 0.2 | 670 | 45/55 | 1.20 |
| Comparative Example 3 | 4.6 | 1.9 | 6.5 | 0.71 | 0.29 | 0.2 | 480 | 100/0 | 0.35 |
| Comparative Example 4 | 5.8 | 0.7 | 6.5 | 0.89 | 0.11 | 0.2 | 420 | 100/0 | 0.35 |
| Comparative Example 5 | 0.0 | 6.5 | 6.5 | 0.00 | 1.00 | 0.2 | 650 | 0/100 | 1.90 |

As is clear from the results of Table 1, presence of J phase in an amount larger than that of H phase (Comparative Examples 2 and 5) gave higher weight increase by oxidation and ignificantly inferior low-temperature oxidation resistance.

Meanwhile, in each of the silicon nitride sintered materials of Examples 1–7, an effective amount of H phase could be precipitated by adding given amounts of $Y_2O_3$ and $Yb_2O_3$ to a mixed powder consisting of particular proportions of α-$Si_3N_4$ and β-$Si_3N_4$, firing the resulting mixture in a $N_2$ atmosphere and then heat-treating the resulting material in air. Thereby, low-temperature oxidation resistance and low-temperature strength could be achieved while high high-temperature strength was retained.

Further, each of the sintered materials of Examples 1–7 had a small difference in strength between the interior and the surface and a sufficient strength ratio, showing excellent strength properties.

As stated above, the present invention can provide a silicon nitride sintered material of small or large thickness which has oxidation resistance and strength at low temperatures while retaining high strength at high temperatures, and a process for production of such a sintered material.

What is claimed is:

1. A silicon nitride sintered material comprising silicon nitride and rare earth elements, wherein Y and Yb are contained as the rare earth elements in a total amount, based on the total amount in moles of silicon nitride and rare earth elements, of 5–7 mole % in terms of oxides, Yb/Y is 4/6 to 9/1 in terms of molar ratio of oxides, and the crystal phases of grain boundary contain a H phase and a J phase with the proportion of the H phase being larger than that of the J phase.

2. A silicon nitride sintered material according to claim 1, which gives a flexural strength of 500 MPa or more at 1,400° C. as measured for a test piece cut out from the center of 20 mm-thick sample of silicon nitride sintered material.

* * * * *